Jan. 4, 1966     J. E. HECKETHORN     3,227,497
PISTON ROD SEAL FOR SHOCK ABSORBERS
Filed April 25, 1963     2 Sheets-Sheet 1
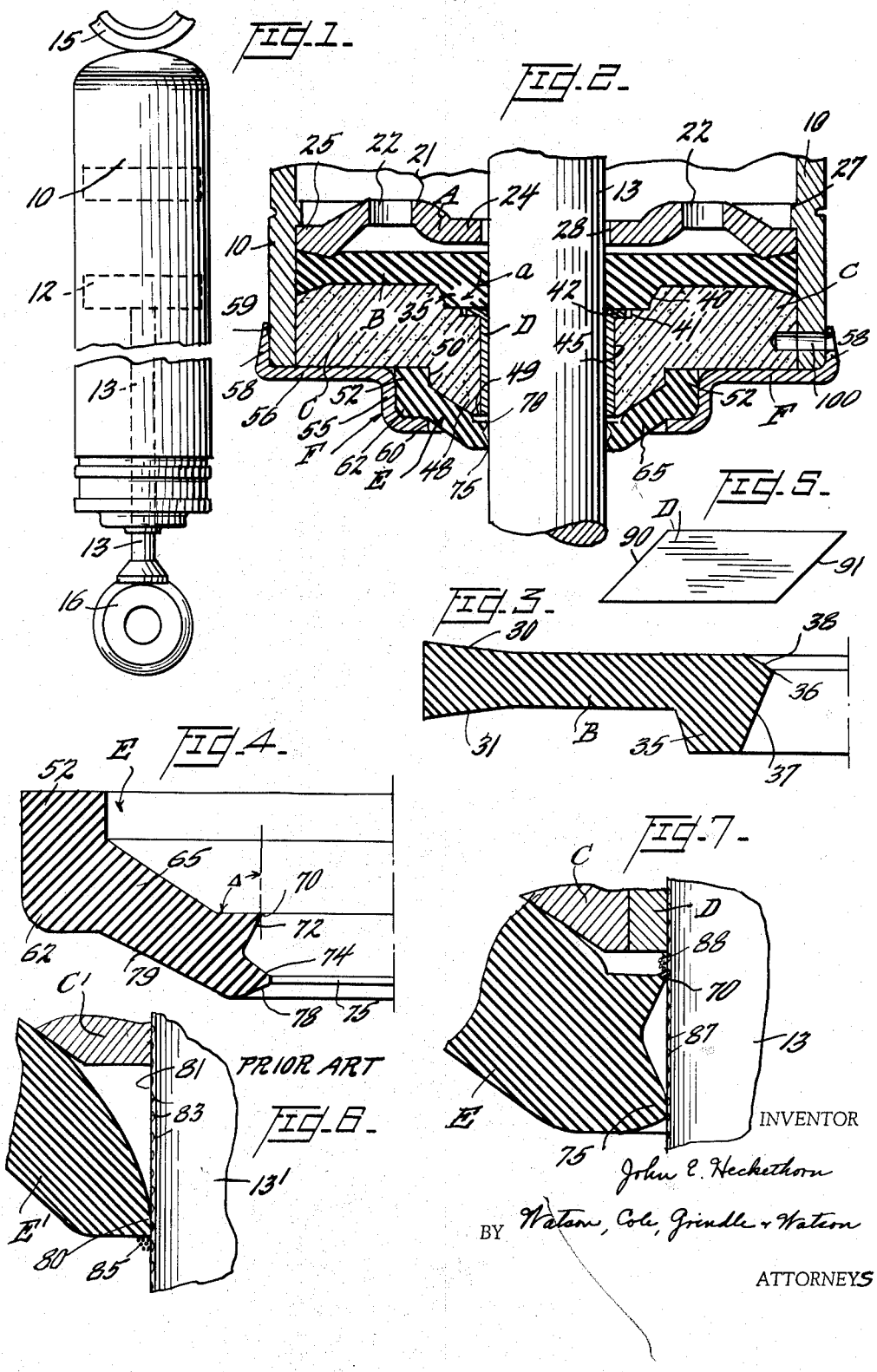

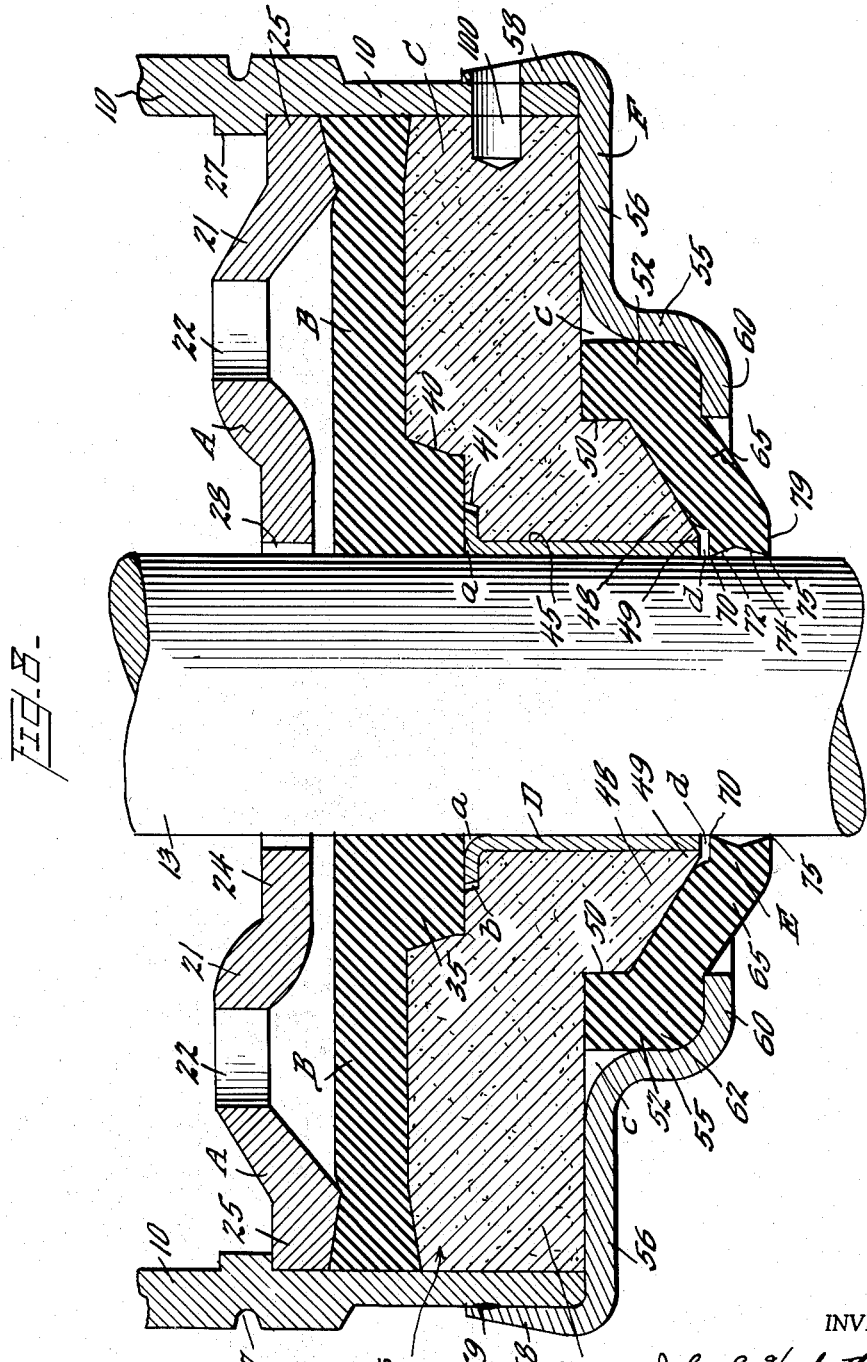

United States Patent Office 3,227,497
Patented Jan. 4, 1966

3,227,497
PISTON ROD SEAL FOR SHOCK ABSORBERS
John E. Heckethorn, Dyersburg, Tenn., assignor, by mesne assignments, to Christian Marie Lucien Louis Bourcier de Carbon, Neuilly-sur-Seine, France
Filed Apr. 25, 1963, Ser. No. 275,557
3 Claims. (Cl. 308—3.5)

This invention relates to shock absorbers and more particularly to sealing structures for the piston rods of reciprocating cylinder-and-piston shock absorbers.

This application is a continuation-in-part of my co-pending application Serial No. 191,147, now abandoned, filed April 30, 1962.

The general object of the invention is the provision, in a shock absorber of this class, of a novel and improved sealing assembly which is not only highly effective in providing a pressure actuated primary seal for the piston rod, but one which reduces rod friction to a minimum and also embodies novel rod wiping means which is adapted to further conserve the oil or other damping liquid which might have a tendency to escape through microscopic occlusion in the surface pores of the piston rod.

Old-line reciprocating piston and cylinder shock absorbers, even of the conventional non-pressurized type, have adhered closely to the designs which place the piston rod at the top and connected to the car body, with the cylinder at the bottom and secured to the wheel mounting. It was only since the applicant's assignee developed an "inverted" shock absorber that the reverse connections have been practically developed and made commercially available upon a large scale.

A number of advantages accrue from the positioning of the cylinder uppermost and the piston rod connected at the bottom of the installation, not the least of which is the prevention of excessive emulsification or foaming of the damping liquid; however, the inability of most experimenters to develop a leakproof piston rod seal has apparently prevented them from providing a commercially successful shock absorber of this type.

A further advance in this shock absorber field, namely, the introduction of gas under pressure in the basically hydraulic shock absorber, has made imperative the provision of a practically leakproof rod seal and this is the general object and aim of the present invention.

In its preferred embodiment, the invention contemplates the provision of a shock absorber cylinder having a seal assembly which is so constructed and arranged as to closely surround and guide the piston rod in its reciprocating movement, but with a minimum of friction, and also to provide novel and improved means for preventing to a much greater degree than thought possible, the loss of damping liquid through the seal; all this, in spite of the rather high pressurization of the cylinder.

The main sealing or packing element of the novel shock absorber exhibits features of novelty in its pre-formed configuration and its relationship to the cylinder wall, the piston rod, and the inner and outer retainer and guide elements, as well as in certain anti-friction features.

Novelty is also apparent in the inner seal retainer element.

The rigid guide bushing through which the piston rod extends also embodies novel features related to the accommodation of both the seal and the anti-friction bushing employed. The sintered iron or other similar material from which the guide bushing is made is well konwn to have oil-absorbing properties and the construction, arrangement, and venting of this bushing has a direct bearing on the wiper provisions set forth below.

An important and signficant feature of novelty resides in the provision of the rod wiper. Somewhat similar elements have been employed in prior production and have generally been referred to as "dust wipers" or similar designations, and have found their chief function in removing road dust, water, and other foreign matter from the rod as it is forced into the cylinder on the compression stroke. Due to the novel and ingenious configuration of the margins or lips of the central opening in the wiper provided by the present invention, any oil which might be carried past the seal through occulsion within the microscopic pores in the surface of the rod is conserved and held in position to be carried back into the cylinder during the next inward movement of the rod, this in addition to the removal of dirt and extraneous particles.

The sintered metal rod guide is continually saturated with oil and it has been found that, under pressure of operation, even a slight excess of leakage has a tendency to accumulate behind the wiper and bulge it away from effective wiping contact with the rod. In order to forestall such an eventuality, a vent opening has been provided leading from the interior of this rod guide to the atmosphere through the wall of the shock absorber cylinder.

Other objects and features of novelty will be apparent from the following specification when read in connection with the accompanying drawings in which one embodiment of the invention is illustrated by way of example.

In the drawings:

FIGURE 1 is a view in elevation on a reduced scale of a shock absorber embodying the principles of the present invention;

FIGURE 2 is an enlarged view in vertical diametric section through the piston rod seal installation at the bottom of the cylinder of the shock absorber;

FIGURE 3 is a further enlarged view in radial section through the rod seal element in relaxed form prior to installation;

FIGURE 4 is a similar view of the rod wiper element;

FIGURE 5 is a plan view of a blank for providing an anti-friction liner element for the installation;

FIGURE 6 is a fragmentary view on a still further enlarged scale of a portion of the piston rod, and illustrating diagrammatically the action of a wiper of certain prior art constructions;

FIGURE 7 is a similar view illustrating the improved action of the wiper afforded by the present invention; and FIGURE 8 is a vertical sectional view similar to FIGURE 2 but depicted on an enlarged scale in order to better trace the oil seepage.

In FIGURE 1 there is diagrammatically illustrated a pressurized or hydro-pneumatic shock absorber of the class to which this invention relates. Other examples may be found in the co-pending application Serial No. 67,784, filed jointly by the present inventor and Christian M. L. L. Bourcier de Carbon.

In the illustrative example shown in FIGURE 1, the shock absorber cylinder is indicated at 10 and disposed for reciprocation in the body of damping liquid within the cylinder is the piston 12 having secured thereto the piston rod 13 which passes through a packed and sealed opening in the lower end of the cylinder 10.

The cylinder 10 is secured to one of the members the relative movements of which are to be damped, such as for example the body or chassis of an automotive vehicle, by means of the eye 15. The lower end of the piston rod 13 is similarly secured to the other member, for example, the wheel mounting of the vehicle, as by means of the eye 16.

The entire novel piston rod sealing assembly is shown very clearly on a somewhat enlarged scale in FIGURE 2 of the drawings, the lower end of the wall of the cylinder 10 and an intermediate portion of the piston rod 13 being clearly depicted.

The several parts of the sealing and wiping assembly will be enumerated and then described in detail and their points of novelty specifically set forth.

First there is the inner retainer element A. Immediately below this element is the seal member B of disc-like configuration and adapted to snugly embrace the piston rod 13. Providing snug seating for the seal B is the guide member C which also fits snugly within the end of the cylinder 10 but which is spaced slightly from the wall of the rod 13 to permit the insertion of the anti-friction liner D.

Then—and this element is of great importance in connection with the present development—there occurs the rod wiper member E, the outer periphery of which is securely seized between a portion of the guide C and the outer retainer cap F.

The inner retainer element A is of disc-like configuration having a raised intermediate annular boss portion 21 which is provided with a suitable number of perforations 22, a depressed central portion 24, and a bevelled peripheral flange portion 25. The wall of the cylinder 10 is staked as at 27 to provide an internal abutment against which the margins of the retainer A may seat to limit its insertion within the lower end of the cylinder. The margins of the central opening in the retainer element A are spaced slightly from the wall of the piston rod as clearly indicated at 28.

The seal element B is shown, in its relaxed condition before installation, in FIGURE 3 of the drawings and will be seen to comprise a circular plate or disc of rubber-like material. The seal element is preferably molded from a low-friction synthetic rubber such as, for example, a Buna "N" compound. The outer margins of the upper and lower surfaces of the element B are each sloped outwardly, say, for example, in the amount of 11°, as indicated at 30 and 31 in FIGURE 3, although this exact angularity is not critical.

Centrally of the seal disc B there is provided a downwardly projecting boss or extension 35 and the central opening within the element B is of unusual double tapered formation as shown in FIGURE 3. The narrowest portion of the opening bounded by the lip 36, is of considerably smaller internal diameter than the external diameter of the piston rod 13. Merely as a suggested ratio, it can be stated that for a piston rod of 0.437" diameter, the opening at the lip 36 of the seal B could have a diameter of approximately 0.340".

Downwardly of the lip dimension the opening is flared outwardly through an angle of approximately 20° on each side as at 37, making a total conical taper of 40°.

It may be said that the shape of the opening and the relative dimensions thereof with regard to the diameter of the piston rod should be such as to afford a snug fit exerting maximum pressure at the lip 36 and graduated downwardly to the bottom of the opening where the pressure can be approximately zero, when the seal is applied.

Above the lip circle 36 the opening is also tapered off to a certain extent as at 38 to blunt the lip circle and give a more rugged and wear-resisting contact with the piston rod.

The guide bushing C is of harder material, preferably of sintered iron. Sintered iron is preferred because of the dimensional accuracy which may be attained and also of the cost factor.

The upper surface of the guide C is provided with a recess or indentation 40 for the reception of the base portion 35 of the seal B. A further shallow narrow counterbore is formed at 41 for the accommodation of the flange 42 of the anti-friction liner D. To accommodate the liner D the central opening 45 of the guide C is of a diameter sufficiently greater than the outside diameter of the piston rod to snugly allow for the thickness of the liner D.

The guide C has a downwardly projecting bevelled or frusto-conical boss or extension indicated at 48 and this extension has a very narrow flattened apex portion 49 and an annular shoulder indicated at 50.

The wiper element E is of the peculiar configuration indicated in FIGURE 4 where the element is depicted in its relaxed condition. The relatively thick annular upwardly directed base flange 52 of the wiper E is fitted around the shoulder 50 of the guide member and is clamped firmly between that shoulder and the intermediate annular portion 55 of the retaining cap F. This cap has a flat circular area 56 which abuts the lower surface of the guide C and the end edge of the wall 10 of the cylinder and can serve as a guide for aligning these two elements. An annular peripheral flange 58 on the cap F embraces the exterior of the end portion of the cylinder and can be welded thereto as suggested at 59. An inwardly directed flange 60 is formed on the cap F and embraces the curved portion 62 of the wiper E and helps retain the outer portion of this wiper in firm position with respect to the assembly.

The wiper E has a frusto-conical inwardly directed portion 65 which terminates at a central opening of rather complex fishtail wall configuration in cross-section, as clearly shown in the relaxed position depicted in FIGURE 4 of the drawings. An inner lip 70 presents a sharp circular edge which is pressed into a firm contact with the wall of the piston rod when the device is assembled.

The lip 70 is intended to form an upwardly directed scoop and for this purpose the external angle Δ between the vertical wall of the piston rod and the upper surface of the lip 70 should not be less than 90°. From the lip 70 the wall of the central opening of the wiper E then retreats outwardly as at 72, the angularity of this portion being suggested as 62° with the horizontal in FIGURE 4 but should not be limited to this amount. The wall of the opening then extends inwardly in a sloping or conical direction as at 74 and terminates at a lip 75 which as indicated may be blunted slightly, the width of the lip being but a few thousandths of an inch. This lip constitutes the narrowest portion of the opening and is spaced slightly inwardly of the sharper inner lip 70.

The remainder of the opening considered in the downward direction comprises the outwardly sloping conical portion 78 which as suggested may make an angle of approximately 70° with the vertical. This portion 78 merges gently with the outer surface 79 of the wiper E, this surface also being inclined with respect to the horizontal at approximately an angle of 128°, although these angularities are suggestive and not limiting, just so the resulting configuration of the lips of the wiper perform the functions to be described.

Now, it has been noticed that even in the case of piston rods which are finely ground and lapped, there exists a certain "roughness" which is not visible to the naked eye but which is not completely removed during the final lapping operation. Piston rods are finely ground and lapped to a very fine finish, but these tiny scratches, visible only under a microscope, exceed 0.0015" in width and 0.0001" in depth, the scratches lying at right angles to the piston rod axis. The existence of such microscopic roughness and their extremely small dimensons are described in Kent's Mechanical Engineers' Handbook (12th Edition) pages 24–28 to 24–32.

During the development of the shock absorber of which this invention comprises a part, it was noted that a rod seal believed to be nearly absolutely leakproof, may start to leak slightly under the previously employed conditions of construction and operation. After much study and investigation it was found that the "pores" in the surface of the piston rod, constituted by the microscopic scratches referred to above, are apparently filled with damping liquid as the rod emerges from the seal. When no rod wiper is used, the fluid apparently remains within these microscopic portions of the rod surface and re-enters the shock absorber unit without being lost during the reciprocation of the rod in normal operation. However, when a single-lip wiper of previously known construction is added to the assembly, the liquid filled pores in the rod slide past the lip in the extension or rebound direction of movement but are apparently "scooped" dry by the wiping lip as the rod re-enters the unit on the compression stroke. In effect, it is believed that the combination of the seal, the wiping lip, and the microscopically porous rod surface acts as a sort of pump. The rod pores enter the working chamber empty and return filled with damping liquid. Although the capacity of these pores is exceedingly minute, continual stroking of the rod results over a period of time in considerable loss of liquid.

Therefore, as a principal feature of the present invention, there has been added a second or inner lip to the wiper with an internal diameter still of slightly less amount than the outside diameter of the piston rod but in effect facing in the direction toward the seal of the shock absorber. This is the lip indicated at 70 in the drawings.

This supplemental lip 70, in effect, "scoops" the liquid from the rod pores as the rod moves in the extension or rebound direction and keeps it in contact with the surface of the rod as the latter re-enters the seal upon its return or compression movement. Thus, no liquid is lost during the operation.

In FIGURE 6 of the drawings there is schematically illustrated the theoretical operation of a wiper arrangement in which the lip 80 of the wiper E' is directed at an outward angle to the wall 81 of the piston rod 13'. The microscopic pores are indicated in greatly exaggerated degree at 83 and those above the wiper lip 80 are apparently full of damping liquid and as they pass the lip 80 during the outward movement of the rod 13' the liquid in the pores passes by the lip also, but upon return movement the edge of the lip 80 scoops the oil or other damping liquid out of the pores as suggested in highly magnified form at 85 and thus the oil is lost and the rod returns to the cylinder dry.

Now by comparison the operation of the wiper E which forms a part of the present invention, is depicted schematically in FIGURE 7 of the drawings. As the pores 87, filled with oil, emerge from the seal assembly, the oil suggested at 88 is scooped by means of the inner lip 70 from the pores and not allowed to escape past the wiper edge. Thus, upon the return movement of the piston rod toward the cylinder the oil 88 is free to re-occupy the pores and thus re-enter the cylinder without excessive loss of damping liquid.

In the passage of the oil back into the cylinder the movement is facilitated by the nature of the tapered opening 37 in the seal B, the opening being potentially widest at the lower portion of the seal and gradually increasing in pressure upwardly thereof.

Of course, the lower lip 75 of the wiper E serves the usual purpose of scooping dust, water, and other extraneous particles from the rod 13.

The enlarged sectional view comprising FIGURE 8 of the drawings affords a graphic means for understanding the "pumping" action of the device and more particularly the safety feature involving the venting means for the microporous sintered metal rod guide C, the purpose of which is to prevent the building up of a quantity of oil under pressure behind the wiper member E.

The sintered bushing C is of a hygroscopic nature and permits the complete saturation of the bushing with the oil which constitutes the damping fluid prior to assembly of the shock absorber. Thus, during operation, a small quantity of oil tends to accumulate between the seal B and the wiper E. This oil will usually fill the crevices and fillets as indicated at a, b, c and d, and even a minute excess of oil in the zone d tends to cause the lip portion of the wiper e to bulge outwardly. This has the effect of the wiper lips losing contact with the piston rod and permitting contaminants to enter the unit.

Now it has been discovered that this pressure build-up particularly in the zone d inwardly of the wiper lips can be effectively prevented by venting the internal structure of the sintered metal rod guide C. Thus, in the illustrated embodiment, a recess 100 is drilled through the flange 8 of the outer plate F, the lower portion of the cylinder wall 10, and entering to a greater or less extent into the body of the rod guide C, all as clearly illustrated in FIGURES 2 and 8 of the drawings.

Since the bushing C is fully saturated prior to assembly, no oil is actually lost through the vent hole unless all of the pockets a–d should become filled due to a slight amount of leakage.

Other useful features of the various elements of the seal may be mentioned. The central depressed portion of the upper surface of the inner retainer disc A as at 24 provides a seat or stop abutment for the lower parts of the piston assembly 12 if the piston should proceed that far during an extreme expansion or rebound movement.

Also, it may be stated that the tapering thickening of the edges of the seal B as at 30 and 31 being of a very slightly greater angularity than the taper of the edge chamfered portions of the guide C and of the retainer A causes a very tight cinching or locking grip on the margin of the seal B resulting in a positive seal at this point.

Also, the interfitting of the downward boss or extension 35 on the seal B within the recess 40 holds this portion of the seal adjacent the rod 13 firmly in place, the outer peripheral walls of the recess 40 serving to prevent any rotative or revolving movement suggested by the arrow a during the downward movement of the piston rod.

Of course, the shallow recess 41 in the central portion of the guide C affords a firm grip on the outturned flange 42 of the liner D and eliminates any tendency of the liner to follow the rod in its reciprocating movements. The liner is preferably made of fiber glass filled Teflon. Teflon is of the TFE-fluorocarbon resin family and requires no lubrication because of its self-lubricating qualities. This is a feature of especial importance in view of the inaccessibility of the liner, it being outside of the working chamber and in a location which would render it otherwise difficult to lubricate.

The liner D is preferably cut according to the pattern shown in FIGURE 5 of the drawings where the blank is of rhomboidal shape, the end edges 90 and 91 being cut at the same angle so that when the blank is rolled up for application to the assembly, the edges 90 and 91 coincide but eliminate any crack or line of separation which would extend in an axial direction.

As employed in the specification and claims, the terms "axially inwardly" and "axially outwardly" refer respectively to directions axially toward and from the interior of the cylinder casing adjacent the end seal.

It is understood that various changes and modifications may be made in the embodiment of the invention illustrated and described herein without departing from the scope of the invention as determined by the subjoined claims.

Having thus described the invention, what is claimed as new and desired to be secured by Letters Patent is:

1. Sealing and guiding means for the piston rod of a hydraulic telescoping cylinder-and-piston shock absorber or the like comprising a cylindrical casing enclosing the working chamber and having an open end through which the piston rod is adapted to reciprocate; said sealing and guiding means consisting of a structure constituting a closure wall for said open end of said casing and surrounding and closely embracing the piston rod, said structure comprising a rigid annular plate of microporous material serving as a rod guide, having an axial opening therethrough through which said piston rod reciprocates, and a flexible resilient deformable but substantially incompressible disc comprising a piston rod seal fixedly retained axially inwardly of said rod guide and having a central opening therethrough within which said piston rod has a snug sliding fit, a wiper member disposed outwardly of said guide and having its radially outer peripheral portion fixed with relation to said casing and with a substantially free central portion having an opening, the inward margins of which are formed as an annular lip with an acute-angle cross-section spaced axially outwardly from the rod guide and directed generally axially inwardly toward the guide and contacting the wall of the piston rod to provide a scoop for any damping liquid which might be carried past the seal upon the rod surface; said inwardly directed wiper and said piston rod seal cooperating to facilitate the return of any escaped damping liquid to said working chamber; and a vent opening through the wall of said casing affording relief for any excess pressure of oil in the zone between the wiper and said seal.

2. The device as set forth in claim 1 in which said rod guide is made of microporous metal and is saturated with the liquid providing the damping medium within the casing.

3. The device as set forth in claim 1 in which said wiper member is further provided outwardly beyond the first named scoop forming lip portion with a peripheral acute-angle lip portion cooperating with said first named lip portion to serve as a wiper for removing dust and other extraneous particles from the rod portions which enter the cylinder.

References Cited by the Examiner
UNITED STATES PATENTS

| | | | |
|---|---|---|---|
| 2,808,277 | 10/1957 | Binder | 308—3.5 |
| 2,907,596 | 10/1959 | Moha | 277—205 |
| 2,981,573 | 4/1961 | Reuter | 308—36.1 |
| 2,992,864 | 7/1961 | DeCarbon | 308—3.5 |
| 3,020,055 | 2/1962 | Allinquant | 277—187 |
| 3,104,916 | 9/1963 | Dowling | 308—3.5 |

FOREIGN PATENTS

| | | |
|---|---|---|
| 848,499 | 7/1939 | France. |
| 135,882 | 12/1945 | Sweden. |

DON A. WAITE, *Primary Examiner.*

FRANK SUSKO, *Examiner.*